United States Patent [19]

Fink

[11] 3,727,929
[45] Apr. 17, 1973

[54] PRECISION AIR CHUCK
[75] Inventor: Anton Fink, Albertson, N.Y.
[73] Assignee: Metrology System Corporation
[22] Filed: June 14, 1971
[21] Appl. No.: 152,650

[52] U.S. Cl. .................. 279/4, 279/110, 279/123
[51] Int. Cl. .................. B23b 31/30, B23b 31/16
[58] Field of Search ............... 279/4, 3, 110, 121, 279/123; 269/30, 32

[56] References Cited

UNITED STATES PATENTS

| 3,501,159 | 3/1970 | Scharfen | 279/4 |
| 3,494,627 | 2/1970 | Pirman | 279/121 |
| 2,948,540 | 8/1960 | Garberding | 279/121 X |

Primary Examiner—Gil Weidenfeld
Attorney—Leonard H. King

[57] ABSTRACT

An air actuated multi-jaw chuck. The jaws are actuated by a piston coupled to the jaws by means of an angularly deployed key which mates with a keyway connected to the jaw. Means are provided for adjusting the relationship between the jaw and the actuating mechanism. This permits the achievement of extreme concentricity. A radially acting collet accepts workpieces whose diameters might vary by as much as 0.040 inches and still maintain concentricity.

10 Claims, 8 Drawing Figures

PATENTED APR 17 1973
3,727,929
SHEET 1 OF 2
FIG. 1
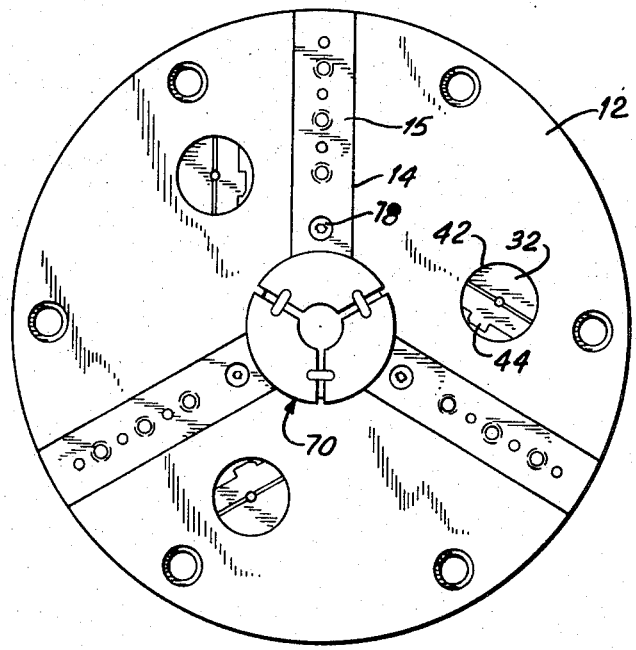
FIG. 2
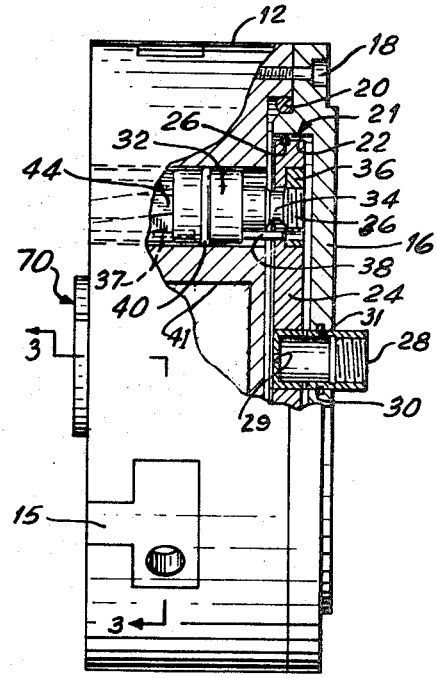
FIG. 3
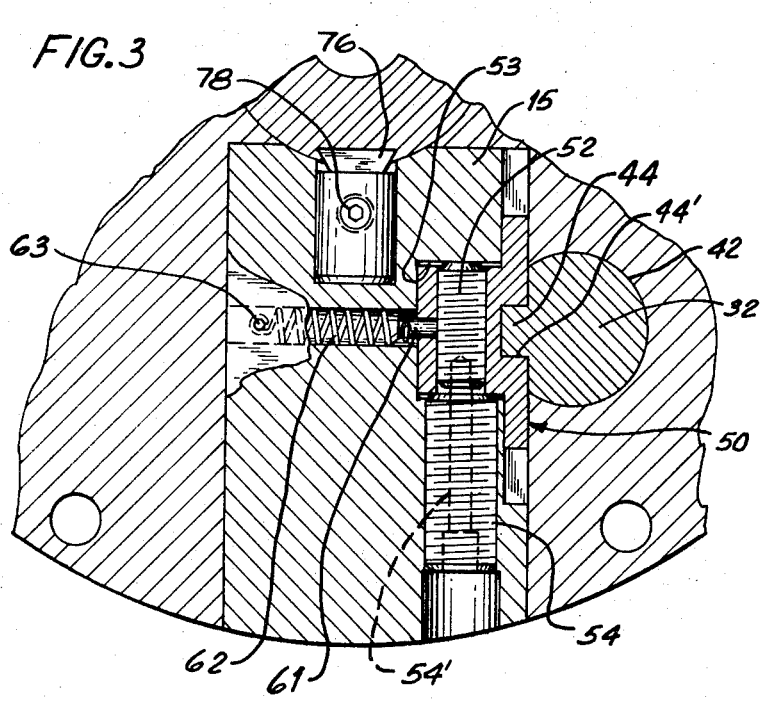
FIG. 4
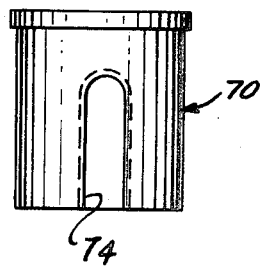
FIG. 5
INVENTOR.
ANTON FINK
BY Leonard H. King
ATTORNEY

INVENTOR.
ANTON FINK

BY Leonard H King

ATTORNEY

PRECISION AIR CHUCK

The aforementioned Abstract is neither intended to define the invention of the application which, of course, is measured by the claims, nor is it intended to be limiting as to the scope of the invention in any way.

BACKGROUND OF THE INVENTION

This invention relates to air chucks.

In performing machining operations on workpieces where the work is of a repetitive nature, it is desirable to have means for rapidly chucking the workpiece in place. For this purpose a number of air actuated chucks have appeared on the market. Such devices have, in general, had limitations. For example, they have been complex and subject to severe maintenance problems. Others have been unable to permit precision repetitive chucking. Primarily, it is the goal of an air chuck to permit quick chucking of workpieces while maintaining accurate positioning of the workpiece relative to a cutting tool.

It is, therefore, an object of this present invention to provide an air actuated chuck which will overcome the above mentioned drawbacks.

It is another object of this invention to provide an air actuated chuck having improved means to individually adjust the position of the jaw relative to an actuating mechanism.

It is a further object of the present invention to provide an improved collet having radially acting clamping segments.

It is a particular object of this invention to provide an air chuck capable of repetitive external and internal chucking to a high degree of accuracy.

A further object of the present invention is to provide an improved air chuck which may be employed to supply coolant through the center of the driving machine spindle for internal grinding.

Still a further object of this invention is to provide an air chuck that may be readily transferred from one machine to the other without the necessity of remachining top jaws.

A still different object of this invention is to provide an air chuck which permits the holding of the workpiece in a clamp position while the chuck is being moved from one machine to another.

These and other objects and advantages of the invention will appear more clearly from the following specification in connection with the accompanying drawing.

BRIEF DESCRIPTION OF THE DRAWING

FIG. 1 is a front elevational view of the chuck;

FIG. 2 is a side elevational view thereof partially broken away;

FIG. 3 is a section taken along line 3—3 of FIG. 2;

FIG. 4 is a top plan view of one segment of a collet employed in the present invention;

FIG. 5 is a front elevational view of the collet segment shown in FIG. 4;

DESCRIPTION OF THE PREFERRED EMBODIMENTS

Figure 6:
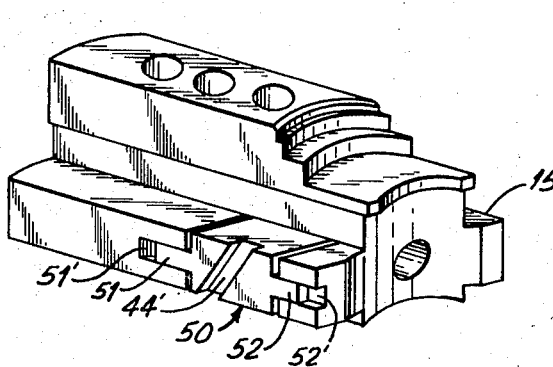
FIG. 6 is a pictorial showing of an actuator jaw.

Referring now to FIG. 1, there is shown steel body portion 12 with channels 14 which receive radially sliding master jaw members 15. The master jaw member 15 is shown pictorially in FIG. 6. A back plate 16 is secured to body portion 12 by means of bolts 18. An O ring 20 effects an air tight seal between back member 16 and body portion 12. Wall 21 defines a cylinder 22 for receiving a piston 24. This piston is sealed against the wall 21 by means of O ring 26. Piston 24 carries a standard threaded coupling 28 to which a dual air hose may be attached. The coupling is provided with a first orifice 29 through which air communicates to one side of the piston and a second orifice 31 through which air communicates to the other side of the piston. By means of a conventional four-way air valve (not shown) air may be admitted to one side of the piston and released from the other side to selectively clamp and unclamp the jaws. As coupling 28 passes through back portion 16, it is sealed thereto by means of an O ring 30.

The piston 24 carries three actuators 32 spaced 120 degrees apart. Each actuator is provided with a shaft portion 34 terminating in a threaded portion 36 to which there is secured a spanner nut 36'. The spanner nut is used to tighten the actuator against the piston and then a hole is drilled through the spanner nut 36 and a pin 38 is inserted to lock the actuator to the piston in a permanent alignment. Each actuator 32 is provided with an O ring seal 40 which lies against a bore 42 in the body 12. Actuator 32 is provided with a key 44 which is skewed relative to the central line of the actuator. For ease of manufacture the actuator is made in two pieces one bearing the skewed key and the threaded portion, and a sleeve carrying the O ring 40. The two portions of the actuator are then locked together by pin 37.

As air is introduced into the cylinder through orifice 29 the piston moves to the rear in the direction of back member 16. This causes the jaws to be actuated in a radial direction toward the center of the chuck, to provide a clamping action. When air pressure is released through orifice 29 and air introduced through orifice 31, the jaws are retracted, permitting removal of the workpiece.

Referring now to FIGS. 3 and 6, jaw 15 is provided with an insert portion 50 which carries a key 44. Insert 50 is provided with keys 51 and 52 which slide in keyways 51' and 52'. The insert is secured by a set screw 52 which seats against wall 53. The set screw 52 is reached by a wrench which passes through a bore 54' in set screw 54. In setting up the jaw alignment, set screw 52 is manipulated to move member 50 to obtain proper alignment relative to keyway 44. When the desired relationship is achieved set screw 54 is locked against member 50 to prevent movement.

Tab 60 receives one end of spring 62, the other end of spring 62 being secured to a pin 63 carried by the jaw member. The function of the spring is to prevent cocking of the member and to maintain it seated against the channel floor.

A feature of this invention is a unique collet. The collet employs three 120° segment portions 70 which are joined together by rubber members 72, as shown in FIGS. 4 and 5. The segments are provided with grooves 73 which receive the rubber inserts 72. At the top of the segment, there is provided a keystone slot 74 adapted to receive a mating key member 76. Member 76 is secured in jaw 15 by means of locking bolt 78. This particular collet, with the rubber insert, moves radially at a perfect right angle relative to the chuck center line and, contrary to conventional divides, does not close on a taper. It will close with the faces coaxially aligned with the workpiece.

An advantage of this collet is that it will accommodate a range of workpieces and, accordingly, a special collet will not be required for each size. The function of the rubber member is to hold the segments aligned.

Figure 8:
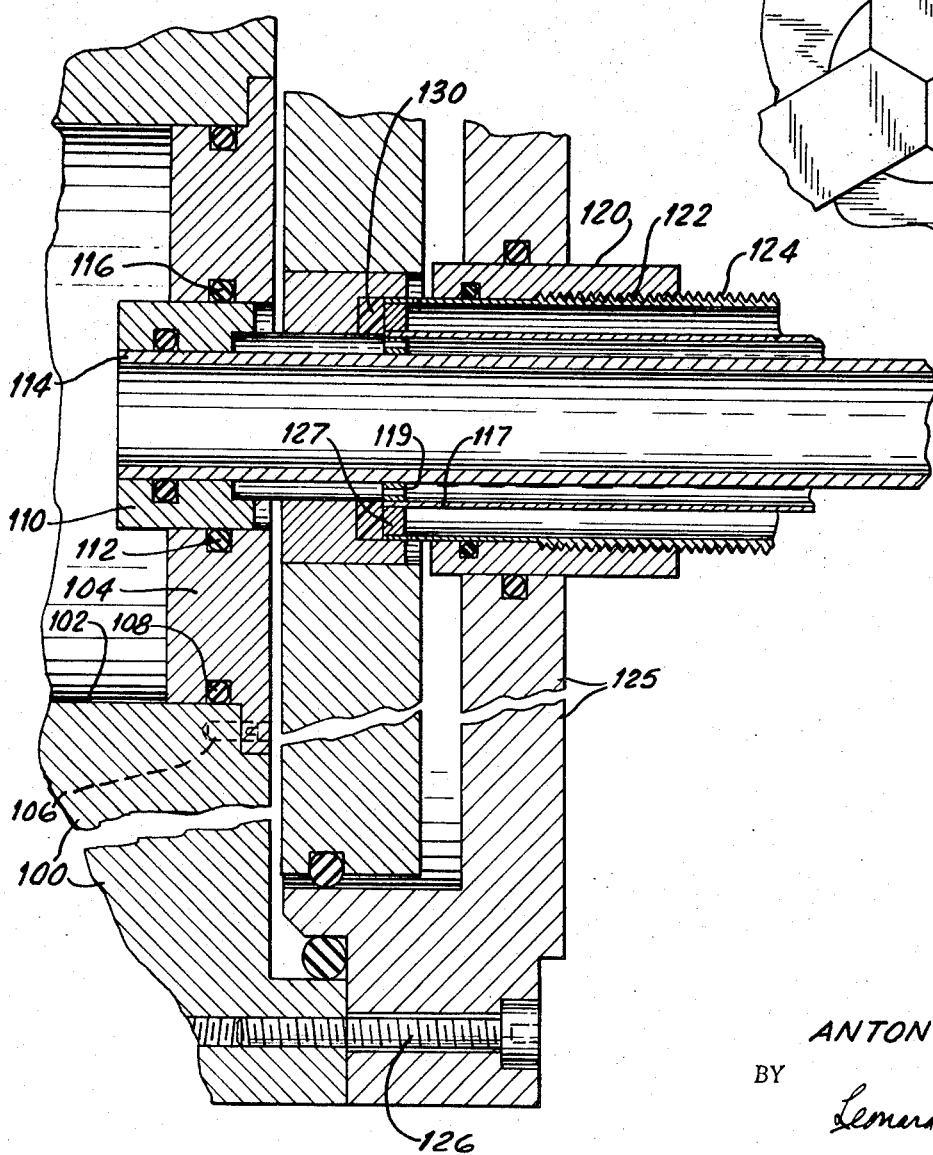
FIG. 8 is a vertical section partially broken away of an air chuck provided with coolant supply means.

In FIG. 8, there is shown an alternative embodiment suitable for use with internal grinders where there is a need for an open bore and means to bring forth material through the center. In this instance, body portion 112 is provided with a central bore 102. Plate 104 is secured to the body portion by means of a series of bolts 106. O ring 108 provides a seal between members 104 and body portion 100. Sleeve 110 is secured to member 104 and is sealed thereto by means of O ring 112. In turn, inner tube 114 is sealed to member 110 by means of O ring 116. Manifold 120 is provided with an internal thread 122 which threadingly receives outer tube 124. Back plate 125 is secured to body portion 100 by means of bolts 126. Inner tube 114 is spaced from center tube 117 by means of annular ring 119 provided with openings through which air flow for the return stroke is provided. Center tube 117 is spaced from outer tube 124 by means of annular ring 127.

The members are permitted to rotate relative to each other through the interaction of teflon seal 30. Rotary joints (not shown) supply air to the two coaxial chambers 132 and 134 for actuating the piston. Coolant flow through the center tube is provided by a rotary joint. Rotary joints are standard items and form no part of the invention.

Figure 7:
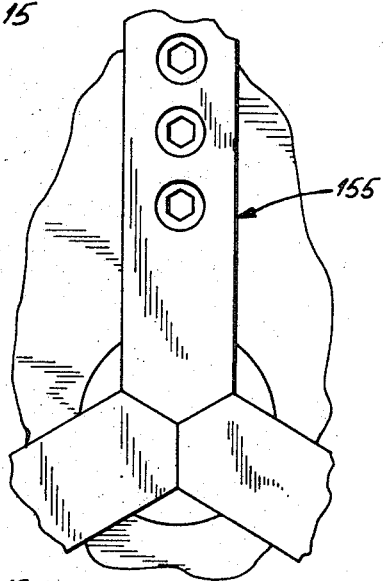
FIG. 7 shows in elevation an alternative jaw arrangement with portions of a chuck broken away.

In FIG. 6, there is shown a typical top jaw attachment for clamping workpieces which is secured to the master jaw. Threaded bore holes 152 shown in FIG. 1 may be used for securing auxiliary holders. As shown in FIG. 7, mating top jaws 155 may be substituted for the collet.

If a one-way valve is employed in series with fitting 28, air pressure is maintained within the cylinder. Since the piston is under pressure the chuck could be moved with a workpiece clamped therein, permitting the air chuck and the workpiece to be moved from machine to machine for further machining operations.

The large recess 41 central to the chuck body permits chucking of parts with extensions, journals or hubs, without the necessity of using extended top jaws.

Since the master jaw may be radially adjusted on an individual basis, hardened top jaws 155 may be employed since they can be adjusted to a true position after mounting.

The devices of this invention have been found to hold workpieces concentric even though diameters of the workpiece may vary by as much as 0.040 inches. With the master jaw adjustment collets may be adjusted for concentricity to compensate for minute inaccuracies. Likewise, if desired, adjustments may be made to cause a collet to run eccentrically by as much as 0.040 inches.

It should be understood that the term "air" is used in its broadest sense and that other gasses may be employed, and also, if desired, liquids may be employed to hydraulically actuate the chuck.

There has been disclosed heretofore the best embodiment of the invention presently contemplated. However, it is to be understood that various changes and modifications may be made by those skilled in the art without departing from the spirit of the invention.

What I claim as new and desire to secure by Letters Patent is:

1. An air actuated chuck which includes:
   a. a chuck body for rotation about an axis;
   b. a plurality of master jaw means supported in channels within said chuck body and radially movable therein relating to the axis from a retracted position to a clamping position and vice versa, said master jaws having keyway means, said keyway means being inclined with respect to the direction of movement of said master jaw means;
   c. a cylinder within said chuck body;
   d. a piston within said cylinder arranged to move axially along the axis;
   e. actuator means carried by said piston for coaxial movement therewith;
   f. key means carried by the actuator means slidably engaging said keyway means to radially move said master jaw means when said piston is moved axially; and
   g. means to vary the radial position of the keyway means relative to the master jaw means.

2. The chuck of claim 1 wherein said keyway means comprises:
   a. a body portion carrying a keyway;
   b. a pair of extending colinear arms slidable in a channel in a said master jaw;
   c. spring means acting on said body portion at right angles to the direction of movement of said arms in the channel of said master jaw.

3. The chuck of claim 1 wherein said keyway means comprises:
   a. a body portion carrying a keyway;
   b. means securing said body portion in the said master jaw for limited movement colinear with said master jaw; and
   c. means for locking said body portion against movement.

4. The chuck of claim 3 including spring means acting on said body portion at right angles to the direction of movement of said arms in the channel of said master jaw.

5. The chuck of Claim 3 wherein said locking means includes:
   a. a first set screw carried by said body portion and oriented colinearly with the master jaw;
   b. a seat carried by said master jaw for engagement by said first set screw to limit movement of the said body portion in a first direction;
   c. a second set screw coaxial with said first set screw carried by said master jaw for engagement with said body portion to limit movement of said body portion in a second direction opposite said first direction.

6. The chuck of claim 5 including spring means acting on said body portion at right angles to the direction of movement of said arms in the channel of said master jaw, and in a direction tending to maintain the said arms pressed against the bottom of the channel.

7. The chuck of claim 5 wherein said second set screw is tubular whereby means for adjusting said first set screw may be inserted therethrough.

8. The chuck of claim 1 including a collet for insertion in a central bore in said chuck body, said collet comprising a plurality of radially movable segments, said segments being joined to each other by resiliently deformable members, each of said segments being joined to a said master jaw for actuation therewith.

9. The chuck of claim 1 including a conduit for cooling fluid extending into the center of said chuck body.

10. The chuck of claim 1 including means for mounting auxiliary jaws.

* * * * *